June 19, 1951    N. I. PERRY    2,557,758
BRAKE CONTROLLING STRUCTURE
Filed Aug. 17, 1945    2 Sheets-Sheet 1
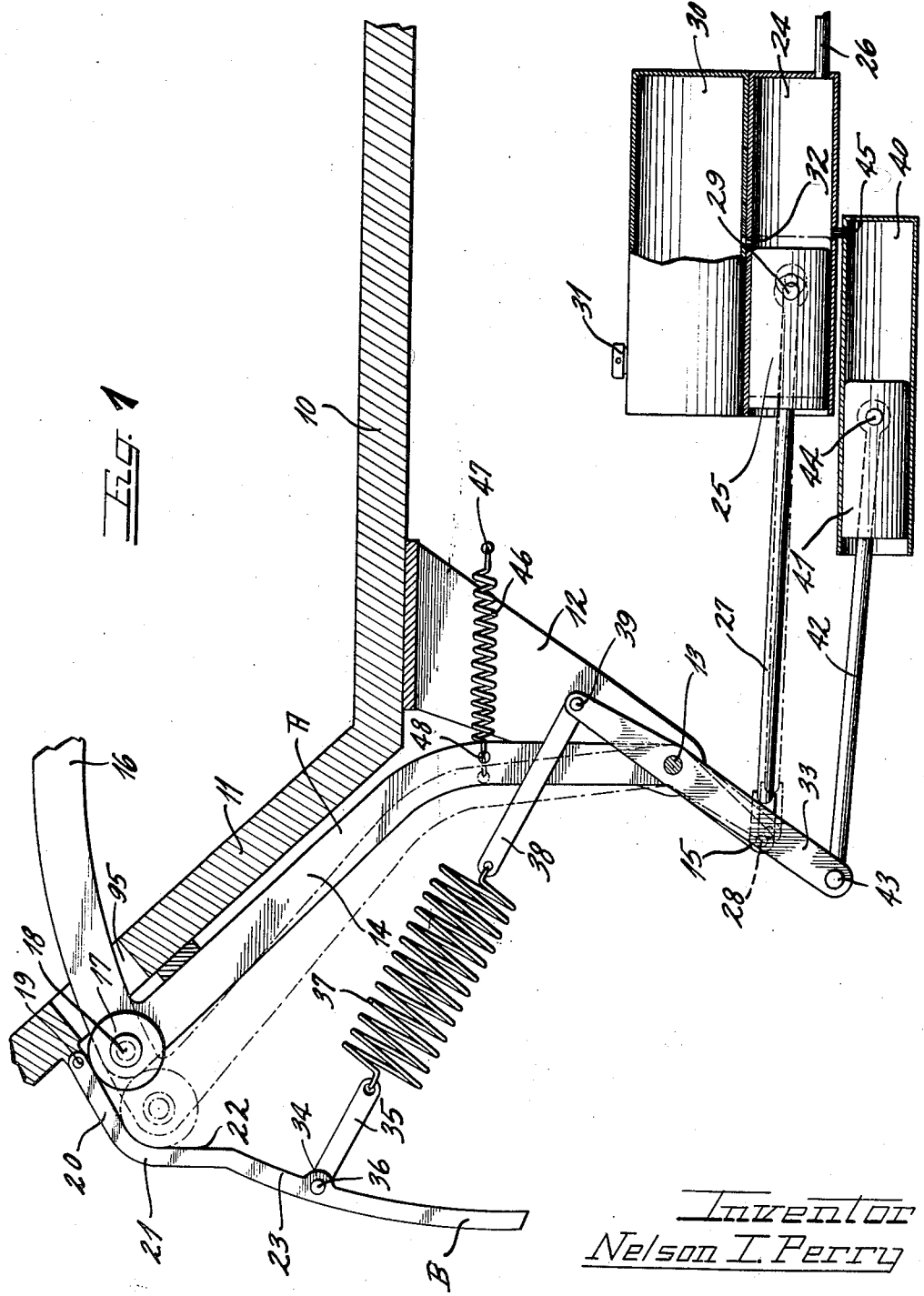
Inventor
Nelson I. Perry
by The Firm of Charles H. Lills Attys.

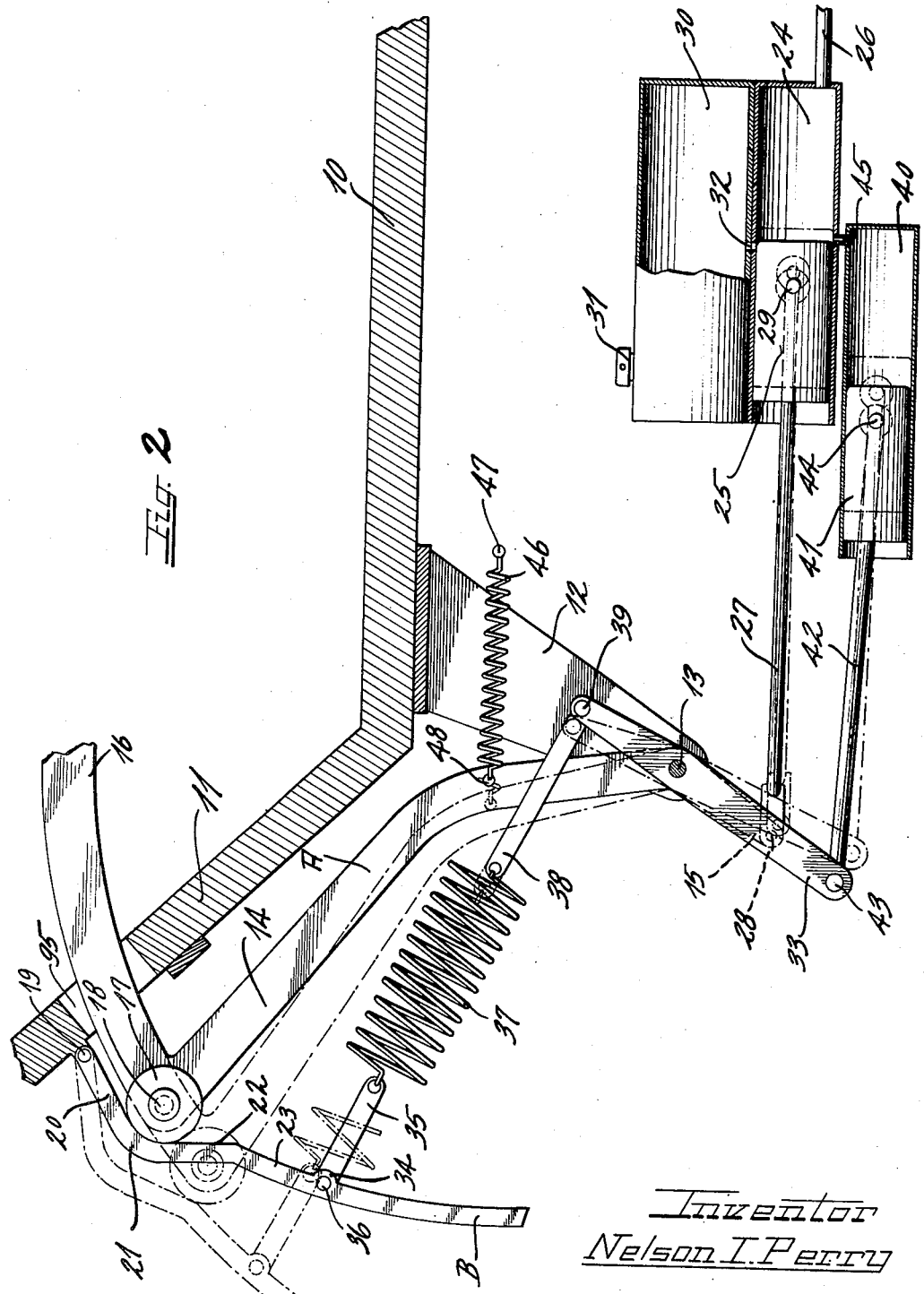

Patented June 19, 1951

2,557,758

UNITED STATES PATENT OFFICE 2,557,758

BRAKE CONTROLLING STRUCTURE

Nelson I. Perry, Chicago, Ill.

Application August 17, 1945, Serial No. 610,935

9 Claims. (Cl. 60—54.6)

The present invention relates to a brake controlling structure and more particularly to quick acting means for taking up slack in hydraulic brake systems used on automotive vehicles.

Hydraulic brake systems for automotive vehicles comprise a closed system through which liquid is forced, by a brake lever or pedal, to apply the brakes. Due to wear of the brake shoes, and sometimes to a leak in the ssytem, the amount of pedal or lever travel, to apply stopping or holding pressure to the brakes, increases so that sometimes when the shoes are excessively worn, or a leak occurs, the brakes will not hold with the pedal or lever at the limit of swing in brake applying direction.

An object of the present invention is to provide quick-acting slack takeup means for hydraulic brake systems.

Another object of the present invention is to provide in a hydraulic brake system means effective on slight initial movement of the brake pedal of given amplitude for moving the brake shoes against the brake drums immediately prior to the application of braking pressure to the system, said means including compensating means to move the shoes against the drums regardless of the worn condition of the shoes, for a given amplitude of movement of the brake pedal.

A further object of the present invention is to provide, in a hydraulic brake system for automotive vehicles, compensating means for slack takeup effective to move the hydraulic fluid in a system a distance sufficient to take up slack of the brake shoes regardless of the worn condition thereof without requiring a corresponding variation of pedal or lever movement.

Generally speaking the present invention contemplates a hydraulic braking system in which a reservoir for excess liquid is in communication with the main or pressure applying cylinder. There is a port between the reservoir and the main cylinder adjacent the head end of the piston in the cylinder when the piston is at rest with the brakes off. A secondary cylinder is arranged in ported communication with the main cylinder. A second piston is movable in the secondary cylinder. A pendulous arm is pivoted at its upper end to be swung by the pedal as the latter is moved in brake applying direction, which arm is connected to the piston of the second cylinder. The arm has a cam surface or profile engaged by the pedal on initiation of its movement in brake applying direction to swing the arm quickly away from its normal at-rest position. This quick movement of the arm through its connection to the second piston imparts a quick kick to the second piston which is sufficient to move liquid in the system from the second cylinder into the first cylinder and then into the line to move the brake shoes against the brake drums of the vehicle, and thus take up the slack prior to the time the piston in the first cylinder becomes effective to apply pressure to liquid in the cylinder. The connection between the arm or bar to the second piston includes an elastic member, so that for a given amplitude of swing of the bar variations in the travel of the second piston may take place, as the amount of travel of the second piston is directly proportional to the amount of wear of the liners of the brake shoes.

The above, other and further objects of the present invention will be apparent from the following description and accompanying drawings.

An embodiment of the present invention is illustrated in accompanying drawings, and the views thereof are as follows:

Figure 1 is the side elevational view of a brake mechanism of the present invention, showing certain parts in section and other parts in elevation, illustrating in full lines the relationships of the parts when the brakes are off, and in dotted lines the positions of certain parts for closing the port between the reservoir and the first or master cylinder, on initiation of pedal or lever movement, and Figure 2 is similar to Figure 1 showing further movement of the brake pedal, the parts shown in full lines representing the movement occasioned by the full line position of the pedal, and in dotted lines other positions are indicated to show relationship of parts when the device is in dotted line position of the pedal.

The drawings will now be explained:

On the drawings:

Referring to Figure 1, a section of floor is indicated at 10 with a portion of a floor board at 11. A bracket 12 is suitably secured to the under surface of the floor board 19, and has pivoted to it at 13 a brake pedal indicated generally as A. The pedal A includes a shank 14, a tail 15 and a pusher 16, to the end of which is secured the usual foot plate, not shown, for the operator's foot. At the junction of the shank 14 and the pusher 16, a roller 17 is pivoted on an axle 18. Pivoted at 19 above the arc of travel of the pusher portion 16, to the underface of the floor foot board 11, is a pendulous or dangling arm or bar B. The arm has three cam surfaces or profiles lying in the path of movement of the roller 17, and engageable successively by the roller as the pedal is moved in brake-applying direction. Profile 20 adjacent the pivot of the arm is straight, then the arm has a portion 21 with a cam profile 22 inclined towards the path of roller movement. The balance of the arm is constructed so that its profile, the third, is arcuate, struck on an arc the center of which is the axis of the pivot 13. The arm B is so pivoted that its straight or first profile of section 20 is tangential to the roller and bears against the roller when brakes are off.

A master cylinder 24 has a piston 25 slidable in it. One end of the cylinder is closed, through which end passes a pipe 26 which conveys liquid from the cylinder to the brake system of the vehicle. A connecting rod 27 is pivoted at one end at 28, to the tail 15 of the pedal A, and at its other end is pivoted at 29 to a wrist pin in the piston 25. Above the master cylinder 24 is a reservoir 30 for containing a supply of liquid. There is a filler opening normally closed by a cap 31. For providing communication between the interior of the reservoir 30 and the cylinder 24 there is a port 32. It will be noted that the port 32 is disposed near the head end of the piston 25 when the same is at rest with the brakes in off position.

Pivoted, intermediate its ends, at 13, the pedal pivot, is a lever 33 which is adapted to rock on the pivot. Formed as a part of the arm or bar B is a lug 34. A link 35 is pivoted at one end of the lug 34 at 36. A coiled spring 37 has one end connected to other end of the link 35 and its other end connected to an end of link 38 which latter is pivoted at its other end at 39 to one, or the upper, end of the lever 33. Among other things the spring 37 functions to hold the bar or arm B against the roller 17.

Disposed below the master cylinder 24 is a secondary cylinder 40 having a piston 41 slidable in it. A connecting rod 42 is pivoted at one end 43 to the lower end of the lever 33 and at its other end is pivoted at 44 to a wrist pin in the piston 41. A port 45 is provided affording communication between the master cylinder 24 and the secondary cylinder 40.

A spring 46 is fastened at one end to a pin 47 in the vehicle structure, and at its other end is hooked at 48 to the shank of the pedal A, and functions to maintain the pedal in its off, or full-line position of Figure 1.

*Operation*

When the brakes are off, the brake shoes are held against stops by springs, in well known manner. With the brakes off the hydraulic system is filled with liquid by reason of the supply in the reservoir 30. With the brakes off, the pressure of the liquid in the system is counterbalanced by the strength of the springs which hold the shoes in off or retracted position, so that initiation of pedal movement will overcome the resistance of the brake shoe springs to enable the system to move the shoes against the brake drums immediately prior to the time braking pressure is applied to the liquid in the system by the piston 25.

The "slack" referred to in this invention is that due to the normal withdrawn position of the brake shoes when the brakes are off. When the shoes have new linings, this slack is very slight. As the linings become worn the slack increases. In other words, the slack contemplated by this invention is that distance through which the shoes must be moved to contact the brake drums immediately prior to the application of braking pressure to the system. This slack may be little or it may be much and is a function of the worn conditions of the linings of the brake shoes.

Referring to Figure 1, the full-line position of the parts denote the positions thereof when the brakes are off. To apply the brakes, the operator gives the brake lever a push. Initial movement of the pedal is that from the full line to the dotted line position of Figure 1. This is the first stage of brake movement, and during this movement the roller 17 rolls along the first or tangential cam profile 20 of the arm B. Movement of the pedal during the first stage of operation does not move the arm or bar B, but does move the piston 25 in the master cylinder 24 a slight distance. The distance indicated by dotted lines in Figure 1, which distance is sufficient to close the port 32 between the reservoir 30 and the cylinder 24. The second stage of pedal movement is that which occurs when the roller 17 engages the cam profile 22 of the bar B. As the roller 17 encounters this profile 22, the bar is swung quickly to the left, or to the dotted line position of Figure 2. This quick or sharp swing of the bar tensions the spring 37 and exerts pull on the links 35 and 38, whereupon the arm 33 is rocked counterclockwise. Such movement of the bar B, being a quick one, will move the piston 41 quickly to the right which movement drives some of the liquid there is in the secondary cylinder 40 up through the port 45 into the cylinder 24 and, because there is no escape from the cylinder, which is completely filled, this liquid will be moved in the system through the pipe 26 taking up any slack there may be between the brake shoes and the drums, thus moving the shoes against the drums ready for the application of braking pressure. Because of the quick movement of the bar B to the left, the piston 41 will be operated ahead of the piston 25, which is movable by its connection to the pedal A. Thus the piston 41 imparts an impulse or kick to the liquid in the system, moving it a greater amount than it is moved by the piston 25, to thus add to the line a sufficient amount of liquid to take up the slack, that is to move the brake shoes against the drums.

Under the impulse imparted to it by the movement of the bar B and the tension of the spring 37, the piston 41 will be moved to the right until it is stopped by the opposition offered by the liquid in the system, which occurs when the shoes are moved against the drums. Piston 41 then stops, somewhere within the length of the cylinder 40 between the full line head of the piston and the right hand end of the cylinder. As before stated, this piston movement would be slight if the brake shoe linings are new or just adjusted and would be greater as the linings wear. As soon as movement of the piston 41 is stopped by the resistance offered by the liquid when the shoes are moved against the drums, further swing of the lever 33 will stop. The fact that the spring 37 is interposed in the connection between the arm B and lever 33 makes it possible for the arm B to move to its limit of travel, irrespective of the fact that the piston 41 is moving or is at rest.

The parts are so arranged that by the time the piston 41 has been moved to fill the system to move the brake shoes against the drums, the piston 25 within the master cylinder will have moved to the dotted line position of Figure 2 and thus close the port to the cylinder 40. Such port closure, of course, stops further progress of the piston 41. Thereafter, continued pedal movement through the third stage, which is that stage represented by engagement of the roller 17 with the arcuate profile 23 of the arm B, applies pressure to the entrapped liquid to thus press the brake shoes against the brake drums with sufficient force to effect the braking action desired.

It must be kept in mind that during the second stage of the pedal movement, that is while the roller 17 is against profile 22 of the arm or bar B, the swing of the arm B to the left may be such as to cause the piston 41 to move to the right far enough to move the shoes against the drums before the roller 17 passes over the peak between the profiles 22 and 23. As before stated, when this takes place, further movement of the piston 41 would stop. If there were a rigid connection between the arm or bar B and the lever 33, stopping of the piston 41 before the roller 17 passes over the peak between the profiles 22 and 23 of the arm or bar B, would prevent further movement of the arm or bar to the left thus preventing actuating of the piston 25 in the master cylinder 24 to apply pressure to the entrapped liquid and then to the brake shoes.

It will be noted that by the three stage operation of the pedal, as described, the initial or first stage movement closes the port between the reservoir 30 and the master cylinder 24. The second stage movement causes operation of the piston 41 to add excess liquid to the system to move the brakes against the drums, thus taking up slack. This movement of the brake shoes depends on the worn condition of the linings, but the present construction makes it possible for the piston 41 to move far enough to take up the slack regardless of the worn conditions of the linings, by a very small amplitude of movement of the pedal. The amplitude of movement of the pedal to take up slack is fixed while the amplitude of movement of the piston 41 is variable. The spring 37 and the connection between the arm B and the piston 41 makes relative movement of the bar and the piston an accomplished fact, and compensates for the difference in relative movement of these two members of the apparatus.

It will be observed that the present invention operates sequentially through at least three stages. The first stage of the pedal operation closes the port between the reservoir and the master cylinder. Second stage of pedal movement injects liquid from the secondary cylinder 40 into the system to move the brake shoes against the drums, and the third stage of movement closes communications between the master cylinder and secondary cylinder and moves the piston 25 against the entrapped liquid to apply braking pressure to the shoes. Let it be understood that the pedal is given a push which is continuous up to the point where the desired pressure has been applied to the brakes. The three stages mentioned occur sequentially during such movement.

When the operator removes his foot from the pedal, the spring 46 returns the pedal to normal or inoperative position, releasing the brakes, the spring 37 returns the arm or bar B to its normal position, and at all times holds the bar or arm B against the roller 17. As the pedal is returned to its normal or off position, the piston 25 is retracted, to open communication between the master cylinder and the secondary cylinder and also between the reservoir and the master cylinder. As the arm or bar B is moved from its dotted line position of Figure 2 to the full line position, the piston 41 is retracted. The strength of the springs which withdraw the brake shoes from the brake drums, when pressure on the pedal is relieved, is sufficient to cause a slight movement of the liquid against the head of the piston 41 to return it to its normal position, if it has not already been moved to such position by the return of the arm B to its normal position.

The stroke of the piston 41 in the secondary cylinder 40 is variable due to the fact that the amount of fluid to be projected into the system to take up slack depends on the worn condition of the liners of the shoes of the brakes. This stroke will vary from minimum to maximum, the minimum being of a slight distance ahead of the full line position of the cylinder as shown in the drawings, with the maximum adjacent the right hand end of the cylinder 40. The piston 41 may be stopped short by (1) new shoe liners, in which event there is substantially no slack in the system, hence very slight movement of fluid need be projected by said piston to move the shoes against the drums; (2) closing of the port 45 between the primary cylinder 24 and the secondary cylinder 40; (3) fluid pressure against it before port 45 is closed.

When the shoes are against the drums, the system is full of fluid with no means of escape whereupon the first or primary piston 25 acts against the fluid with pressure action to apply the brakes.

In the event the shoes contact the drums before the port 45 is closed by piston 25 then there would be the same pressure against the piston 41 as there is against the piston 25. This pressure would, if no compensating means were provided, stop the swing of the bar B before the roller 17 passes over the peak between the second and third profiles of the cam surface of the bar, thus stopping swing of the bar under such circumstances, which would prevent movement of the piston 25 to apply the brakes. The elastic member or spring 37 in the connection between the bar and the secondary piston 41 serves as compensating means to enable movement of the bar to its maximum limit of swing as the roller 17 passes over the peak between the profiles 22 and 23.

The bar B must swing to its limit to permit the roller 17 to ride over the peak between the second and third profiles, as the piston 25 is not movable in pressure applying direction until the roller 17 is on the third profile 23 of the bar, hence compensating means must be provided.

The present invention has been described herein more or less precisely as to details, yet it is to be understood that the invention is not to be limited thereby as changes may be made in the arrangement and proportion of parts, and equivalents may be substituted, without departing from the spirit and scope of the invention.

I claim as my invention:

1. An actuating mechanism for use with a fluid system, a first cylinder, a piston movable in said cylinder, a reservoir in communication with said cylinder, a second cylinder, a piston in said second cylinder, said cylinders having ported communication, a pedal lever connected to the first piston, a pendulous arm pivoted at one end adjacent the pedal, connections between said arm and the second piston, said arm having a cam surface or profile near its pivot which is steep, a roller on said lever in the path of said arm, spring means in said connections normally holding said arm against said roller, the engagement of said roller with said cam quickly swinging said arm about its pivot to move the piston of said second cylinder to propel liquid in the system to take up slack on initiation of pedal movement.

2. A brake actuating mechanism for use with a hydraulic brake system for automotive vehicles comprising, a cylinder, a piston movable in the cylinder, a pedal connected to said piston to move it, a reservoir in communication with said cylinder to maintain the system full of liquid, an arm pivoted at one end adjacent said pedal having an abrupt cam surface near its pivot, a roller on the pedal to contact said cam, a secondary lever rockable on the pedal pivot, a spring connection between said arm and one end of said lever, a secondary cylinder in flow communication with said first cylinder, a piston in said secondary cylinder, a connection between the secondary piston cylinder and the other end of said lever, initial short movement of the pedal moving said first piston to close the port between the first cylinder and reservoir, subsequent short movement of the pedal causing said roller to move the arm quickly away from its normal position thereby imparting quick driving force to said second piston to move liquid in said system to take up slack, and subsequent movement of the pedal closing the port between said first and second cylinders and moving the liquid in the system to apply the brakes.

3. A brake actuating mechanism for use with a hydraulic brake system for automotive vehicles comprising, a master cylinder, a secondary cylinder, a reservoir in flow communication with said master cylinder, pistons in said cylinders, a pedal lever connected to the piston of the master cylinder, a secondary lever connected to the piston of said secondary cylinder, an arm pivotally engaged by said pedal lever to swing, a spring connection between said arm and said secondary lever, initial short movement of the pedal moving the master cylinder piston to close the port to the reservoir and continued pedal movement causing the swing of said arm to quickly move the piston of the secondary cylinder to urge liquid through the system to take up slack, subsequent short movement of the master cylinder piston closing the port to the secondary cylinder and continued movement by the pedal of the piston in the master cylinder moving the liquid in the system to apply the brakes.

4. An actuating mechanism for use with a fluid system, comprising a pivoted lever, a pendulous cam bar pivoted at its upper end and lying in the path of movement of said lever to be swung about its pivot as the lever is moved in a first direction, a first cylinder and piston, a second cylinder and piston, a connection between said lever and said first piston, and a connection between said pendulous bar and said second piston, said cam bar having a series of cam profiles or surfaces thereon engageable successively by said lever as it is moved in said first direction, the second of said cam surfaces being such as to cause quick swing of said cam bar when said second surface is contacted by said lever, the quick swing of said cam bar moving said second piston quickly to provide a relatively great fluid movement in the system for a relative short travel of the lever.

5. An actuating mechanism for use with a fluid system, comprising, a pivoted lever, a pendulous cam bar pivoted at its upper end and lying in the path of movement of said lever to be swung about its pivot as the lever is moved in a first direction, a first cylinder and piston, a second cylinder and piston, a connection between said lever and said first piston, a connection between said cam bar and said second piston, the cam bar having a cam profile thereon engageable by said lever in its initial movement to swing said bar in a known arc, the connection between said cam bar and said second piston being operated by swing of the bar to advance said second piston, said last means including an elastic member which when the cam bar has been swung to its limit by said lever will continue to move said second piston until the fluid in the system attains a limiting pressure.

6. An actuating mechanism for use with a fluid system, comprising, a manually operable lever, a cylinder, a piston within said cylinder having a variable stroke working against the train of liquid in said system, a pendulous bar having a fixed amplitude of swing, said bar lying in the path of movement of said lever to be swung thereby as the lever is actuated in a first direction, a connection between said bar and said piston to move said piston against the train of liquid when the bar is swung in one direction, said connection including an elastic member which when the bar is swung imposes a pushing force against said piston regardless of the then position of the bar to move it and the liquid train until the pressure in the system reaches a limiting value.

7. An actuating mechanism for use with a fluid system, comprising, a manually operable lever, a first cylinder and piston for imposing pressure to apply the brakes, a second cylinder and piston for adding liquid to the first cylinder to rapidly force fluid into the system ahead of said first cylinder, a connection between said lever and said first piston, a pendulous bar supported in the path of movement of said lever and adapted to be swung by said lever as it is moved in a first direction, said bar having a cam surface engageable by said lever to swing said bar in one direction in a fixed arc, a connection betwen said bar and said second piston to move said piston against the liquid in the system as said bar is swung, said connection including an elastic member effective to continue movement of said second piston until the pressure in said system reaches a limiting value.

8. An actuating mechanism for use with a fluid system, comprising, a lever pivoted to swing, a roller pivoted thereto to travel in an arcuate path as the lever is swung, a dangling cam bar pivoted at one end and lying in the path of travel of said roller and having varying cam surfaces thereon engageable successively by said roller as said lever is swung in a given direction, the first cam surface engageable by said roller during the first stage of lever movements being tangent with said roller to prevent any movement of said cam bar as the roller moves through the first stage, said second cam surface being inclined toward and across the arcuate path of travel of said roller whereby said second stage of pedal movement will swing the free end of said cam bar sharply away from said arcuate path of roller travel, the third cam surface being concentric with the pedal axis of swing when the cam member is moved beyond the second stage whereby the third stage swing of the lever will not effect movement of the cam bar, and means set in motion by the rapid swing of the cam bar by the second stage operation of the pedal to inject fluid into the system to ready the system for pressure action of the lever when the lever is moved through the third stage.

9. An actuating mechanism for use with a fluid system, a primary cylinder in flow communication with the system, a piston in said cylinder, a secondary cylinder in flow communication with said first cylinder, a piston in said secondary cylinder having a variable stroke, a lever, a pendulous bar having a fixed amplitude of swing and movable by said lever when the same is moved in a first direction, and connections between said bar and the piston of the secondary cylinder including an elastic member, said elastic member permitting completion of swing of said bar in one direction by said lever in the event that movement of the piston of said secondary cylinder is stopped short of its maximum limit of stroke.

NELSON I. PERRY.

REFERENCES CITED

The following references are of record in the file of this patent:

UNITED STATES PATENTS

| Number | Name | Date |
|---|---|---|
| 1,430,746 | Loughead | Oct. 3, 1922 |
| 1,839,298 | Charles | Jan. 5, 1932 |
| 1,921,008 | Shinn | Aug. 8, 1933 |
| 2,058,063 | Cox | Oct. 20, 1936 |
| 2,168,719 | Staude | Aug. 8, 1939 |
| 2,224,441 | MacKay | Dec. 10, 1940 |
| 2,341,318 | Forbes | Feb. 8, 1944 |
| 2,435,037 | Gardner | Jan. 27, 1948 |

FOREIGN PATENTS

| Number | Country | Date |
|---|---|---|
| 678,541 | France | Mar. 25, 1930 |
| 348,691 | Great Britain | Nov. 13, 1930 |